(12) United States Patent
Passino, Jr. et al.

(10) Patent No.: US 11,492,921 B2
(45) Date of Patent: Nov. 8, 2022

(54) BYPASS VALVE ASSEMBLY FOR TURBINE GENERATORS

(71) Applicant: Mechanical Dynamics & Analysis LLC, Latham, NY (US)

(72) Inventors: Mark Jeffrey Passino, Jr., Clifton Park, NY (US); Andrew Koonce, Clifton Park, NY (US); Matthew Monty, Clifton Park, NY (US); Dominick Werther, Clifton Park, NY (US); Roy Satzman, Clifton Park, NY (US)

(73) Assignee: Mechanical Dynamics & Analysis LLC, Lantham, NY (US)

( * ) Notice: Subject to any disclaimer, the term of this patent is extended or adjusted under 35 U.S.C. 154(b) by 346 days.

(21) Appl. No.: 16/790,064

(22) Filed: Feb. 13, 2020

(65) Prior Publication Data
US 2020/0182079 A1     Jun. 11, 2020

Related U.S. Application Data

(62) Division of application No. 14/882,706, filed on Oct. 14, 2015, now Pat. No. 10,605,110.

(51) Int. Cl.
*F01D 15/10*     (2006.01)
*F16K 39/02*     (2006.01)
(Continued)

(52) U.S. Cl.
CPC ............. *F01D 15/10* (2013.01); *F01D 17/00* (2013.01); *F01D 17/105* (2013.01); *F01D 17/14* (2013.01);
(Continued)

(58) Field of Classification Search
CPC combination set(s) only.
See application file for complete search history.

(56) References Cited

U.S. PATENT DOCUMENTS

| 1,290,722 A | 1/1919 | Doble |
| 2,114,858 A ‡ | 4/1938 | Rosch ................ F16K 47/04 251/122 |

(Continued)

OTHER PUBLICATIONS

Toshiba, Preventive Maintenance of Major Steam Valves, 2 pages, Aug. 29, 2017.

(Continued)

*Primary Examiner* — Matthew W Jellett
*Assistant Examiner* — Christopher D Ballman
(74) *Attorney, Agent, or Firm* — Burris Law, PLLC

(57) ABSTRACT

A bypass valve assembly for a turbine generator includes a valve body, bypass seats, valve stem, valve cap, bypass valve disc, bypass valves, and pressure seal head. The valve body defines a central bore and a plurality of passageways. Each passageway has an inlet smaller than its outlet. Each bypass seat is within the inlet of a corresponding passageway. The bypass seats have a higher wear resistance than the valve body. The valve stem is within the central bore. The valve cap is secured to the valve body. The bypass valve disc is secured to the valve stem. Each bypass valve has a base portion and a nose portion. Each nose portion defines a contoured surface area with a wear coating and extends into a corresponding passageway. The pressure seal head is disposed around the valve stem and defines steps having a wear coating.

20 Claims, 8 Drawing Sheets

(51) Int. Cl.
  *F01D 17/10* (2006.01)
  *F16K 1/12* (2006.01)
  *F01D 17/14* (2006.01)
  *F01D 17/00* (2006.01)
  *F01D 25/00* (2006.01)
  *F16K 25/00* (2006.01)
  *F16K 25/04* (2006.01)

(52) U.S. Cl.
  CPC .............. *F01D 25/005* (2013.01); *F16K 1/12* (2013.01); *F16K 25/005* (2013.01); *F16K 25/04* (2013.01); *F16K 39/024* (2013.01); *F05D 2210/12* (2013.01); *F05D 2220/31* (2013.01); *F05D 2230/80* (2013.01); *F05D 2230/90* (2013.01); *F05D 2260/606* (2013.01); *F05D 2300/2262* (2013.01); *F05D 2300/2283* (2013.01)

(56) References Cited

U.S. PATENT DOCUMENTS

| | | | | |
|---|---|---|---|---|
| 2,791,992 A ‡ | 5/1957 | Robinson | | |
| 2,995,148 A ‡ | 8/1961 | Novak | | |
| 3,141,476 A * | 7/1964 | Davis | .................... | F01D 17/145 251/86 |
| 3,601,157 A ‡ | 8/1971 | Milleville | ........... | F16K 31/1262 137/630.14 |
| 3,782,412 A ‡ | 1/1974 | Darash | | |
| 4,481,776 A * | 11/1984 | Araki | .................... | F01D 17/145 137/614.19 |
| 4,499,731 A * | 2/1985 | Moser | .................... | F01D 17/143 417/407 |
| 4,574,585 A * | 3/1986 | Conn | ................. | F04D 27/0223 415/27 |
| 4,640,091 A * | 2/1987 | Blizzard | ................ | F01D 17/105 60/795 |
| 4,702,209 A * | 10/1987 | Sausner | ................ | F02M 3/075 123/585 |
| 4,881,500 A ‡ | 11/1989 | Kojima | | |
| 4,892,118 A ‡ | 1/1990 | Davis | .................... | F01D 17/145 137/625.3 |
| 5,044,604 A ‡ | 9/1991 | Topham | .................... | F16K 1/36 251/120 |
| 5,080,392 A * | 1/1992 | Bazergui | ................ | F16F 9/06 280/124.159 |
| 5,168,843 A ‡ | 12/1992 | Franks | | |
| D341,188 S ‡ | 11/1993 | Burgy | | |
| 5,486,018 A * | 1/1996 | Sakai | .................... | B60G 21/06 280/124.16 |
| 5,505,587 A ‡ | 4/1996 | Ghetzler | .............. | B64D 41/007 415/144 |
| 5,544,484 A * | 8/1996 | Voss | ........................ | F01D 17/14 60/397 |
| 5,579,643 A * | 12/1996 | McEwen | .............. | F02B 37/025 415/151 |
| 5,687,562 A * | 11/1997 | Stewart | .................... | F02K 3/06 60/226.3 |
| 5,775,098 A * | 7/1998 | Philippona | ............ | F01D 17/105 60/226.3 |
| 6,230,742 B1 ‡ | 5/2001 | Bircann | | |
| 6,389,341 B1 * | 5/2002 | Davis | .................. | B60G 21/067 188/274 |
| 6,536,472 B2 ‡ | 3/2003 | Baumann | .............. | F16K 39/022 137/625.3 |
| 6,964,554 B2 * | 11/2005 | Groenendaal | ........... | F01D 9/047 415/209.2 |
| 7,108,244 B2 ‡ | 9/2006 | Hardin | ..................... | F16K 1/34 251/120 |
| 7,207,176 B2 * | 4/2007 | Mulloy | .................... | F01D 17/14 60/277 |
| 7,272,929 B2 * | 9/2007 | Leavesley | .............. | F01D 17/167 60/602 |
| 7,383,859 B2 * | 6/2008 | Takahashi | ................. | F16K 1/36 137/625.33 |
| 7,475,540 B2 * | 1/2009 | Parker | ...................... | F02C 6/12 415/157 |
| 7,770,902 B1 * | 8/2010 | Davis | .................... | B60G 3/145 180/9.5 |
| 8,191,368 B2 * | 6/2012 | Garrett | ...................... | F02C 9/18 415/157 |
| 8,291,703 B2 * | 10/2012 | Garrett | ................. | F01D 17/167 60/602 |
| 8,353,664 B2 * | 1/2013 | Lombard | ................ | F01D 9/026 60/602 |
| 8,534,687 B2 * | 9/2013 | Coombs | .................... | F16F 9/18 188/266.2 |
| 8,534,994 B2 * | 9/2013 | Lombard | ................ | F01D 25/24 60/602 |
| 8,763,385 B2 ‡ | 7/2014 | Leone | ...................... | F02D 11/10 123/1 R |
| D736,893 S ‡ | 8/2015 | Iwamoto | | |
| 9,328,729 B2 ‡ | 5/2016 | Marica | .................. | F04B 53/001 |
| 10,234,038 B2 * | 3/2019 | Nagayo | ................. | F02B 37/183 |
| 11,156,151 B2 * | 10/2021 | Reif | ...................... | F16K 11/085 |
| 2002/0066270 A1 ‡ | 6/2002 | Rouse | .................... | F01K 23/10 60/670 |
| 2002/0122717 A1 * | 9/2002 | Ghetzler | ................ | F01D 17/06 415/35 |
| 2005/0223707 A1 ‡ | 10/2005 | Ikeda | ...................... | F23R 3/04 60/725 |
| 2006/0283503 A1 ‡ | 12/2006 | McCausland | | |
| 2008/0122226 A1 * | 5/2008 | Madison | ................ | F03B 13/00 290/52 |
| 2009/0214787 A1 ‡ | 8/2009 | Wei | .......................... | C23C 8/02 427/255.394 |
| 2009/0241544 A1 * | 10/2009 | Bellows | .................. | F01D 25/246 60/657 |
| 2010/0307613 A1 * | 12/2010 | Temme | .................... | F16K 1/44 137/551 |
| 2011/0173974 A1 * | 7/2011 | Grabowska | ........... | F01D 17/105 60/602 |
| 2012/0306206 A1 * | 12/2012 | Agrawal | ................. | F04D 25/024 290/52 |
| 2013/0336776 A1 * | 12/2013 | Siddle | ................... | F04D 29/167 415/208.1 |
| 2014/0110945 A1 * | 4/2014 | Takahashi | ............... | F01K 25/10 60/671 |
| 2014/0361208 A1 ‡ | 12/2014 | Tsuji | ...................... | F01D 17/145 251/368 |
| 2016/0312708 A1 ‡ | 10/2016 | Chen | .................... | F02C 7/2365 |
| 2017/0191482 A1 ‡ | 7/2017 | Preuss | ................. | F04D 15/0083 |

OTHER PUBLICATIONS

Ilustrations of prior art valve configurations, 1 page, believed to be available prior to Oct. 14, 2015.

\* cited by examiner
‡ imported from a related application

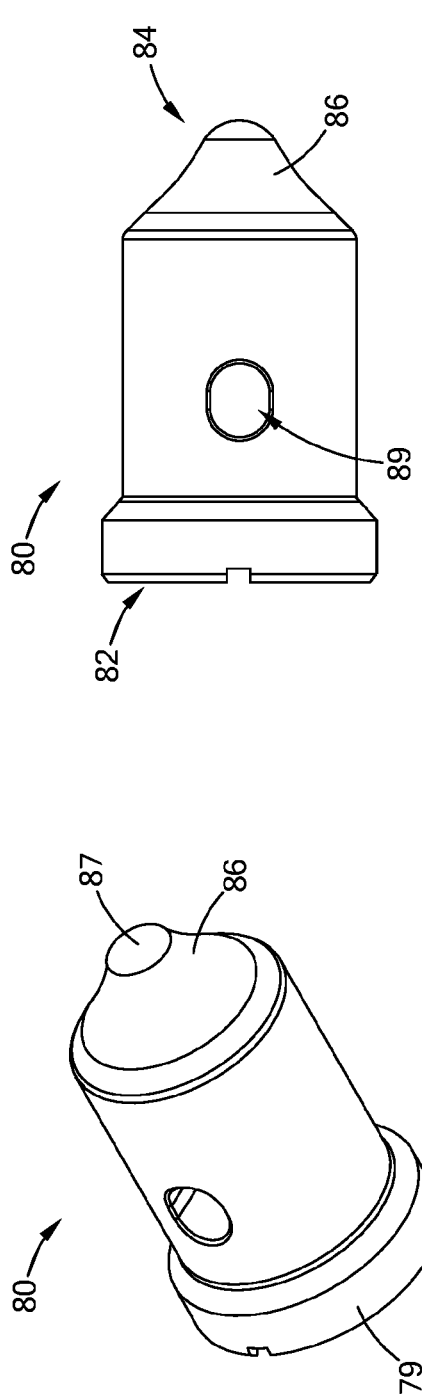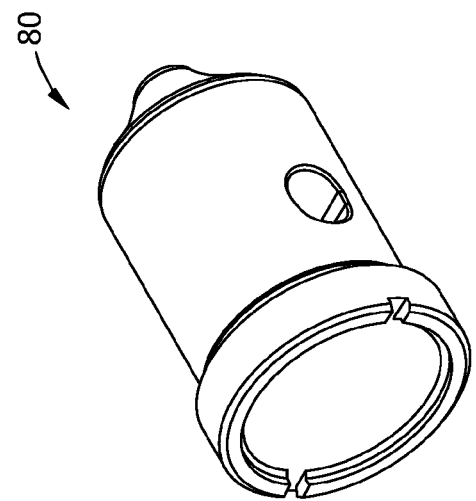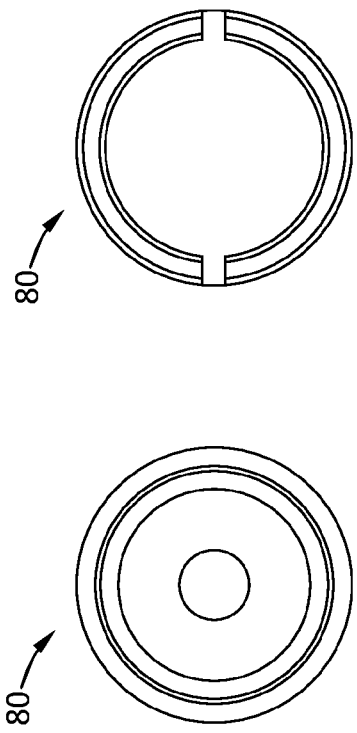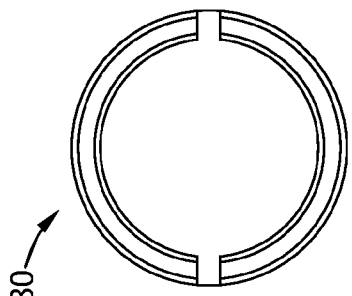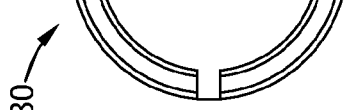
FIG. 8A
FIG. 8B
FIG. 8C
FIG. 8D
FIG. 8E

BYPASS VALVE ASSEMBLY FOR TURBINE GENERATORS

CROSS-REFERENCE TO RELATED APPLICATIONS

This application is a divisional of U.S. application Ser. No. 14/882,706, filed on Oct. 14, 2015. The disclosure of the above application is incorporated herein by reference.

FIELD

The present disclosure relates to valve assemblies for turbine generators, and more specifically to steam valve assemblies provided on steam inlets of turbine generators used in energy powerplants.

BACKGROUND

The statements in this section merely provide background information related to the present disclosure and may not constitute prior art.

Turbine generators typically include bypass valves, often part of a main valve, that permit only a portion of the normal flow through a conduit to pass to another portion of a conduit. Such bypass valves may be useful when starting up a turbine generator so as to more gradually warm the turbine generator to its operating temperature.

It is not uncommon for the fluid flowing through the main valve and/or the bypass valve to erode the various components in the valves over a period of time. Erosion of the valves and its components may lead to reduced performance and increased maintenance costs to repair and replace the eroded or worn parts.

The bypass valve may be at greater risk of erosion than the main valve. The bypass valve, by its very nature, may be opened only a small amount to limit the amount of flow through the bypass valve. Of course, with a restricted flow area, the velocity of a fluid at a given pressure will be relatively higher than it otherwise would be were the bypass valve opened a greater amount. Thus, the relatively higher velocity of any fluid through the bypass valve may cause greater erosion than might occur were the velocity of the fluid slower. Further, any entrained solids or other constituents in the fluid further increases the risk of erosion occurring.

The geometry of the bypass valve, too, plays a role in the risk of erosion occurring. Typically, the flow of fluid is redirected as it passes around and through the bypass valve, risking greater erosion than would otherwise occur in the absence of any change in direction. Previous designs of bypass valves have included valve tips with rounded or swirled geometries that it was hoped would reduce erosion. Such designs, however, have been unsatisfactory in reducing erosion within the bypass valves.

SUMMARY

The present disclosure will now become more easily understood in view of the attached drawings and in the details of construction and operation as more fully described and claimed below. Moreover, it should be appreciated that several aspects of the present disclosure can be used with bypass valves and valve assemblies for turbine generators and other applications in which such valves control the flow of fluids, such as gas (e.g., steam), liquids, or plasma.

In one form, a bypass valve assembly for use in turbine generators includes a valve body defining a central bore and a plurality of passageways. Each passageway has a smaller area at an inlet portion and a larger area at an outlet portion to define a flared passageway. A plurality of bypass seats are disposed within each of the inlet portions of the passageways, the bypass seats being formed of a material having higher wear resistance than the valve body. A valve stem is disposed within the central bore of the valve body. A valve cap is secured to a distal end portion of the valve body. A bypass valve disc is secured to a distal end portion of the valve stem. A plurality of bypass valves is disposed within the plurality of passageways within the valve body. Each bypass valve includes a base portion and a nose portion, with each nose portion defining a predefined contoured surface area. At least a portion of the contoured surface area includes a wear coating disposed thereon. A pressure seal head is disposed around a distal end portion of the valve stem. The pressure seal head defines proximal facing steps having a wear coating disposed thereon. Optionally, the wear coating includes one or more of a PEMS (plasma enhanced magnetron sputtering) nanocoating, a cobalt-chromium alloy such as the Stellite® brand alloy, high velocity oxygen fuel (HVOF) coatings, titanium carbide, titanium nitride, and other hard-facing or hardened coatings. An example of a PEMS nanocoating a titanium silicon carbonitride (TiSiCN).

In another form, a bypass valve assembly for use in turbine generators comprises a valve body that defines a central bore and a plurality of passageways. Each passageway has a smaller area at an inlet portion and a larger area at an outlet portion to define a flared passageway. A plurality of bypass seats is disposed within each of the inlet portions of the passageways. The bypass seats are formed of a material having higher wear resistance than the valve body. A valve stem is disposed within the central bore of the valve body. A valve cap is secured to a distal end portion of the valve body with at least one socket bolt securing the valve cap to the valve body. Optionally, a cap pin is disposed under a head of the socket bolt and extends into a corresponding cavity in the valve body. A bypass valve disc is secured to a distal end portion of the valve stem. A plurality of bypass valves is disposed within the plurality of passageways within the valve body. Each bypass valve includes a base portion and a nose portion, with each nose portion defining a predefined contoured surface area. Optionally, at least a portion of the contoured surface area includes a wear coating disposed thereon. Each of the bypass valves also includes an elongated passageway extending laterally between the base portion and the nose portion with a plurality of pins disposed within each of the elongated passageways of the bypass valves and further extending into the bypass valve disc. A pressure seal head is disposed around a distal end portion of the valve stem. The pressure seal head defines proximal facing steps having a wear coating disposed thereon.

In yet another form, a bypass valve for use in a valve assembly for a turbine generator includes a base portion and a nose portion. The nose portion defines a predefined contoured surface area that defines an inwardly tapering geometry that is a function of an amount of valve lift and a fluid flow rate past the predefined contoured surface area. At least a portion of the contoured surface area has a wear coating disposed thereon.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 8A is a perspective view of a bypass valve and its predefined contoured surface area in accordance with the principles of the present disclosure;

FIG. 8B is a side view of the bypass valve of FIG. 8A;

FIG. 8C is a bottom view of the bypass valve of FIG. 8A;

FIG. 8D is a top view of the bypass valve of FIG. 8A; and

FIG. 8E is a top perspective view of the bypass valve of FIG. 8A.

Figure 1:
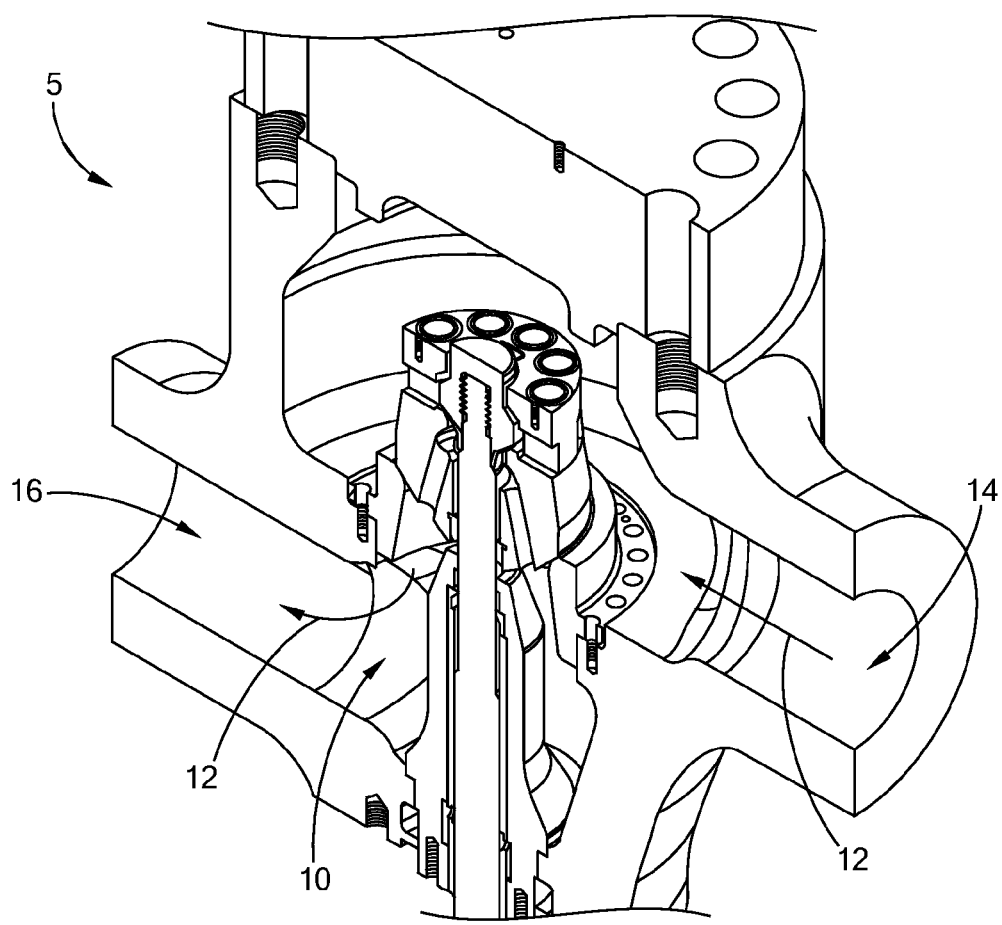
FIG. 1 is a perspective cut-away view of an exemplary form of a main valve assembly and a bypass valve assembly coupled to a first conduit and a second conduit.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a main valve assembly 5 optionally equipped with a bypass valve assembly 10 positioned in a fluid path 12 of a first conduit 14 and a second conduit 16 is illustrated. While FIG. 1 illustrates that the main valve assembly 5 controls the flow between the first conduit 14 and the second conduit 16, it will be appreciated that the main valve assembly 5 may be positioned within a single conduit in an in-line application. The conduits 14 and 16 may be of any type of conduit to contain and direct a flow of a fluid along a desired path, and includes various pipes, passages, and other similar structures. The fluid passed through the conduits 14 and 16 may be gaseous, liquid, or a multi-phase (i.e., gaseous and liquid) flow of one or more constituent types of fluid. In addition, the fluid may contain one or more types of entrained solids. As illustrated in FIG. 1, forms of the main valve assembly 5 and/or the bypass valve assembly 10 may be incorporated into turbines, generators, turbine generators, engines, and other such devices.

The bypass valve assembly 10 may be configured to be an original component of the main valve assembly 5, or it may be configured to be a retrofit unit. For example, the bypass valve assembly 10 may be configured to be installed as a replacement for an in-place bypass valve assembly of the same or different design during maintenance, either as individual components or as a whole integral unit.

Figure 2:
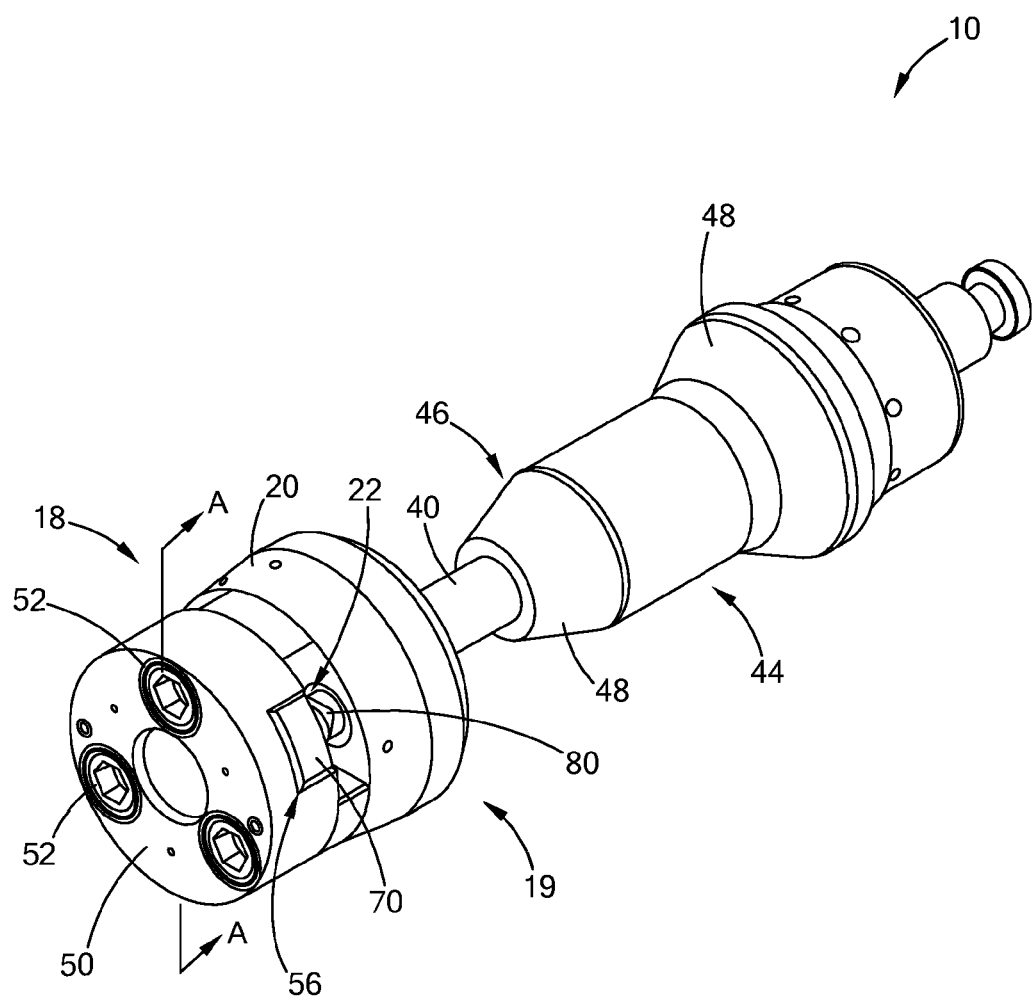
FIG. 2 is a perspective view of a form of a bypass valve assembly constructed in accordance with the principles of the present disclosure.

FIGS. 2-7 illustrate various aspects of forms of a bypass valve assembly 10. Referring to FIG. 2, the bypass valve assembly 10 includes a valve body 20. A valve stem 40 extends away from a proximal portion 19 of the valve body 20. A bypass valve disc 70 is secured to a distal end portion 42 (FIG. 3) of the valve stem 40.

Figure 4:
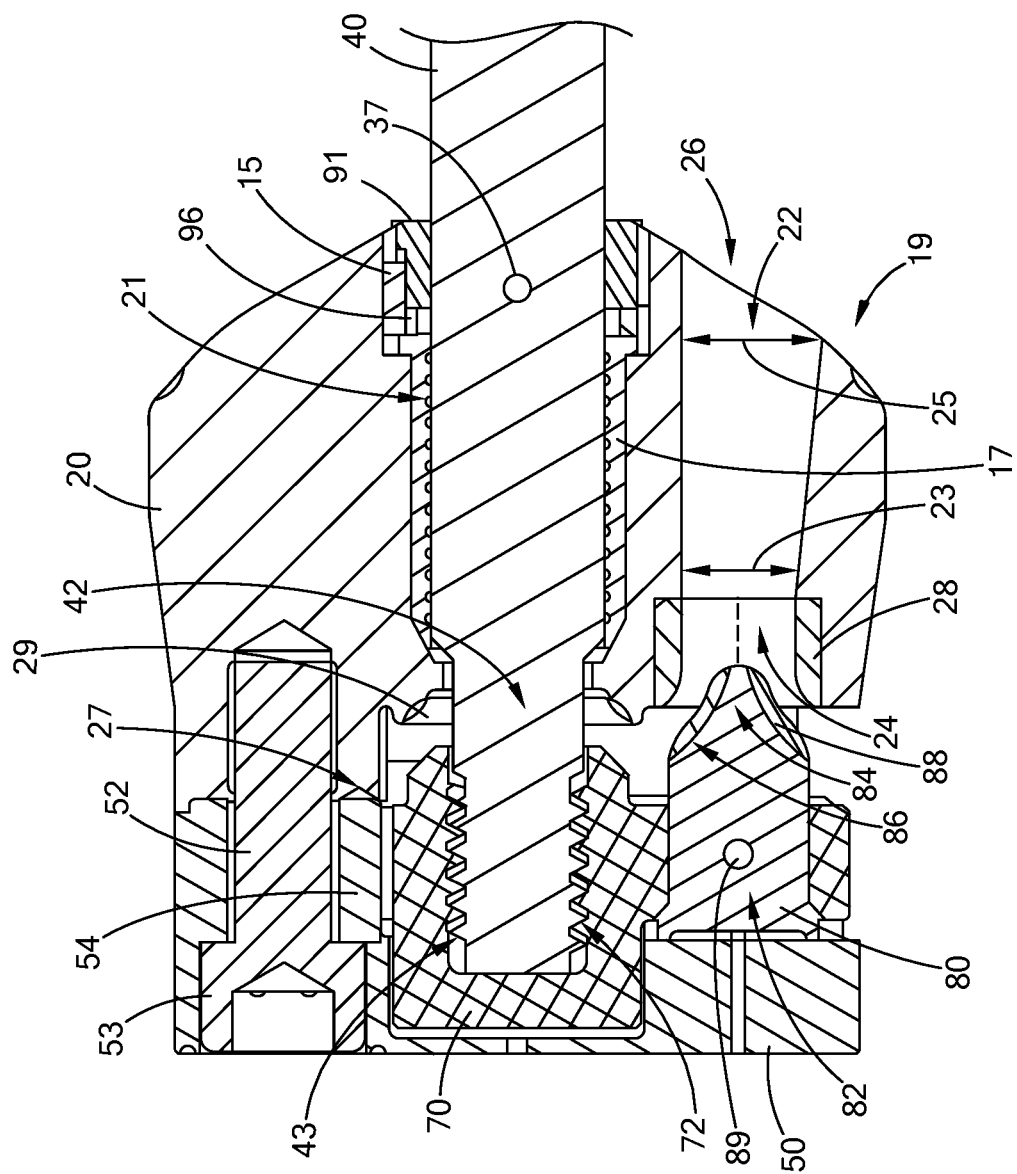
FIG. 4 is an enlarged view from FIG. 3, illustrating a valve body, valve disc, valve cap, and bypass valve constructed in accordance with the principles of the present disclosure.

A valve cap 50 is secured to a distal portion 18 of the valve body 20 with at least one socket bolt 52. Optionally, a cap pin 54 is disposed under a head 53 of the socket bolt 52 and extending into a corresponding cavity 27 in the valve body 20, as best illustrated in FIG. 4. Optionally, the valve cap 50 covers at least a portion of the bypass valve disc 70 when the valve cap 50 is coupled to the valve body 20. In some forms, the valve cap 50 includes one or more recess 56 (FIG. 2) configured to receive at least a portion of an arm 76 (FIG. 5) of the bypass valve disc 70.

Turning to FIG. 4, the valve body 20 defines a central bore 21. The central bore 21 may be sized and configured to receive at least one bushing 17 disposed within the central bore 21 and at least partially around the valve stem 40. The bushing 17, in some forms, includes a wear coating, such as a cobalt-chromium alloy such as the Stellite® brand alloy or other wear coating, disposed on at least a portion thereof. In some forms, the valve body 20 includes at least one passageway 22 and, as illustrated, the valve body 20 may include a plurality of passageways 22. As illustrated, the valve body 20 includes three passageways 22, only one of which is visible in the cross-section view in FIGS. 3 and 4. Each passageway 22 is spaced approximately 120 degrees apart from the adjacent passageways 22, although the spacing of each passageway 22 may be spaced more than or less than 120 degrees apart from any adjacent passageways 22. Optionally, each passageway 22 has a smaller area 23 at an inlet portion 24 and a larger area 25 at an outlet portion 26 to define a flared passageway 22. While the passageway 22 typically may be cylindrical or oval in cross-sectional shape, other cross-sectional shapes of the passageway 22 fall within the scope of the disclosure.

The valve body 20 optionally includes a plurality of bypass seats 28 disposed within each of the inlet portions 24 of the passageways 22. Typically, there is at least a bypass seat 28 associated with each passageway 22. The bypass seats 28 are formed of a material having higher wear resistance than the valve body 20. The material of the bypass seats optionally is cobalt-chromium alloy material. The valve body 20 also defines a plurality of distal facing surfaces 29 in flow communication with a fluid during operation. The distal facing surfaces 29 may include a wear coating disposed thereon.

As mentioned above, the valve stem 40 extends away from a proximal portion 19 of the valve body 20. The valve stem 40 is disposed within the central bore 21 of the valve body 20, as illustrated best in FIG. 4. Optionally, the valve stem 40 is configured to be moved relative to the valve body 20 in a direction towards and away from the distal end 18 of the valve body 20.

Figure 5:
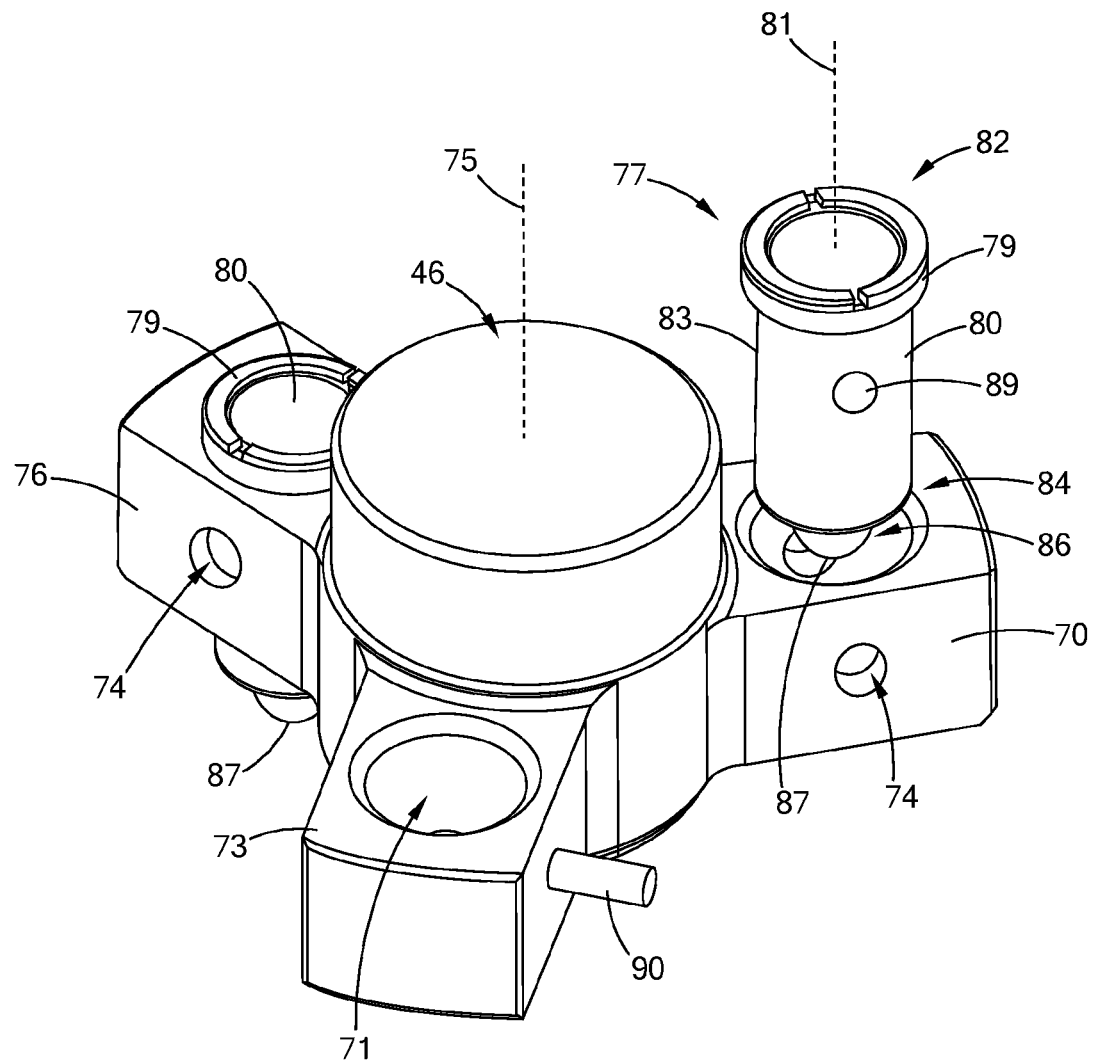
FIG. 5 is a perspective view of the valve disc and the bypass valve of FIG. 4.

As mentioned, a distal portion 42 of the valve stem 40 is coupled or secured to a bypass valve disc 70. The valve stem 40 may include a threaded portion 43 configured to be threaded into a recess 72 of the bypass valve disc 70, or it may be coupled to the bypass valve disc 70 in other known ways. As illustrated in FIG. 5, the bypass valve disc 70 optionally includes one or more arms 76 that extend radially away from a centerline 75 of the bypass valve disc 70. The arm 76 include a through hole 71 configured to receive a bypass valve 80 as will be discussed below. The holes 71 typically are configured to be substantially aligned with at least an inlet portion 24 of the passageway 22 of the valve body 20 when the bypass valve disc 70 is coupled to the valve body 20.

The bypass valve assembly 10 also includes at least one and, optionally, a plurality of bypass valves 80 as illustrated in FIGS. 4 and 5, and more specifically in FIGS. 8A through 8E. Each bypass valve 80 is configured to be disposed at least partially within one of the passageways 22 of the valve body 20 during operation. Each bypass valve 80 includes a base portion 82 and a nose portion 84 spaced apart from the base portion 82. Optionally, the nose portion 84 defines a predefined contoured surface area 86. In some forms, the predefined contoured surface area 86 is an inwardly tapering geometry, i.e., a geometry tapering from a surface 83 of the bypass valve 80 towards a centerline 81 of the bypass valve. In other forms, the predefined contoured surface area transitions distally into a truncated nose 87, a frusto-conical shape, rounded, or other cylindrical shape as illustrated in FIG. 5. The predefined contoured surface area 86, such as an inwardly tapered geometry, is a function of an amount of valve lift and a fluid flow rate past the predefined contoured surface area 86. The predefined contoured surface area 86 is an engineered geometry that defines a specific shape, transitioning into the nose portion 84, which delivers specific flow characteristics for proper operation of the valve assembly 10 and increased life. Accordingly, as used herein, the term "predefined contoured surface area" shall be construed to mean this engineered geometry, which may be in the form of a B-surface, a Bezier surface, or a combination of geometric surfaces to achieve the proper flow characteristics.

At least a portion 88 of the contoured surface area 86 includes a wear coating disposed thereon. The wear coating of the contoured surface area 86 of the bypass valves 80 optionally is selected from one or more of a PEMS (plasma enhanced magnetron sputtering) nanocoating, a cobalt-chromium alloy such as the Stellite® brand alloy, high velocity oxygen fuel (HVOF) coatings, titanium carbide, titanium nitride, and other hard-facing or hardened coatings. An example of a PEMS nanocoating a titanium silicon carbonitride (TiSiCN). Another example of a PEMS nanocoating includes one in which the average grain size of the nanocoating is less than 10 nanometers. Yet another example of the wear coating includes those in which the Vickers Pyramid Number (HV) is greater than 3,000 HV and, more preferably, greater than 4,000 HV. Yet another example of a wear coating includes those with a thick nanocoating layer, typically a thickness between 5-30 micrometers (i.e., depth relative to the coated surface) and, more preferably, a thickness between 15-20 micrometers.

In some forms, the bypass valve 80 also includes an elongated passageway 89 extending from the surface 83 at least partially through the bypass valve 80 and laterally between the base portion 82 and the nose portion 84. The elongated passageway 89 is configured to receive a pin 90 (FIG. 5). Stated differently, a plurality of pins 90 are disposed within each of the elongated passageways 89 of the bypass valves 80, with the pins 90 further extending into one or more partial-holes or through-holes 74 of the bypass valve disc 70 so as to couple the bypass valve 80 to the bypass valve disc 70.

The bypass valve 80 also optionally includes a radial flange 79 disposed around a proximal end 77 of the base portion 82. For example, the radial flange 79 may extend radially away from the centerline 81 and the surface 83 of the bypass valve 80. The radial flange is adapted for engagement with an adjacent component for longitudinal positioning of the bypass valve 80. For example, the radial flange 79 may be configured to interact with a surface 73, such as an upper surface, of the bypass valve disc 70. Thus, as can be seen best in FIG. 5, the bypass valve 80 extends at least partially into and through a through-hole 71 in the bypass valve disc 70.

Figure 3:
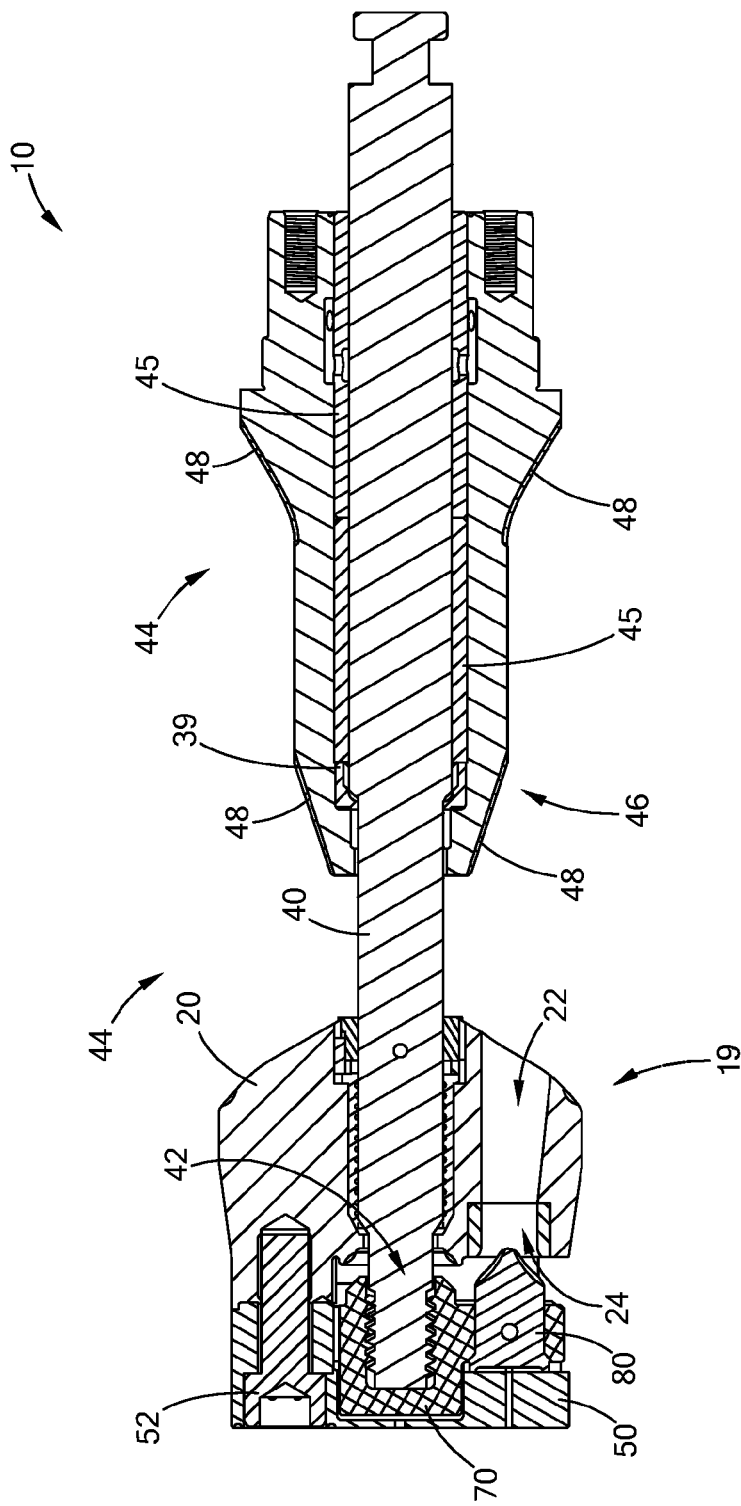
FIG. 3 is a cross-sectional view, taken along line A-A of the bypass valve assembly of FIG. 2.
Figure 6:
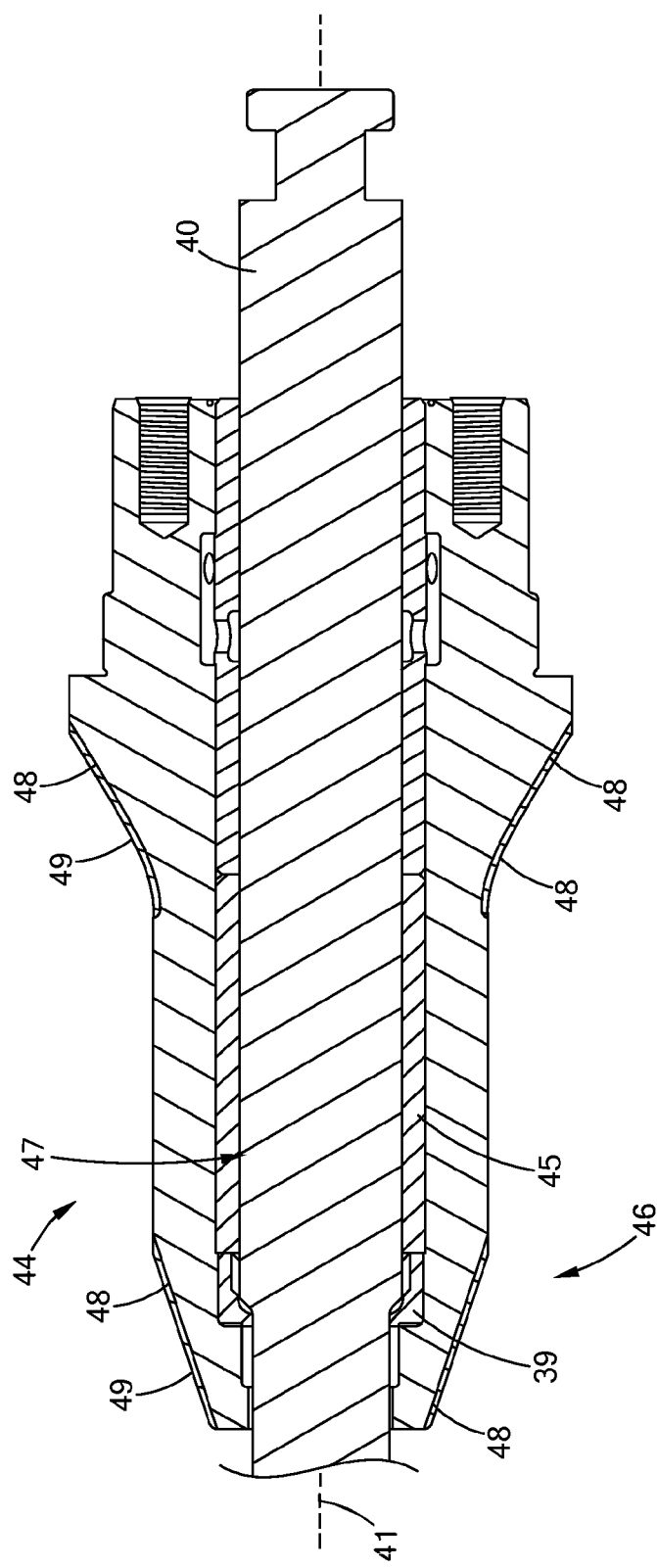
FIG. 6 is an enlarged view from FIG. 3, illustrating one form of a valve stem and a pressure seal head constructed in accordance with the principles of the present disclosure.

Referring to FIGS. 3 and 6, the valve stem 40 includes a pressure seal head 46 disposed at least partially around a distal end portion 44 of the valve stem. Optionally, the pressure seal head 46 defines at least one and, in some forms, a plurality, of proximal facing steps 48 having a wear coating 49 disposed thereon. In some instances, the wear coating is of greater hardness than the hardness of the valve stem 40 and/or the valve body 20. For example, the wear coating 49 of the proximal facing steps 48 may comprise a cobalt-chromium alloy material. The proximal facing steps 48 optionally may be tapered such that each proximal facing step 48 extends further radially from a centerline 41 of the valve stem 40 the further the proximally facing step 48 extends towards the distal end portion 44 of the valve stem 40. In other forms, one or more of the steps 48 may be oriented differently (e.g., distal facing) depending on the application.

Optionally, the pressure seal head 46 includes a central passageway 47. The central passageway 47 may be sized and configured to receive at least one bushing 45 disposed within the central passageway 47 and at least partially around the valve stem 40 and adjacent to the pressure seal head 46. Additionally, the central passageway 47 may receive a seat ring 39 proximate a distal end portion of the valve stem 40. The seat ring 39 may be disposed at least partially around the valve stem 40 and adjacent to the pressure seal head 46. The bushing 45 and/or the seat ring 39, in some forms, include a wear coating, such as a cobalt-chromium alloy such as the Stellite® brand alloy or other wear coating, disposed on at least a portion thereof.

Figure 7:
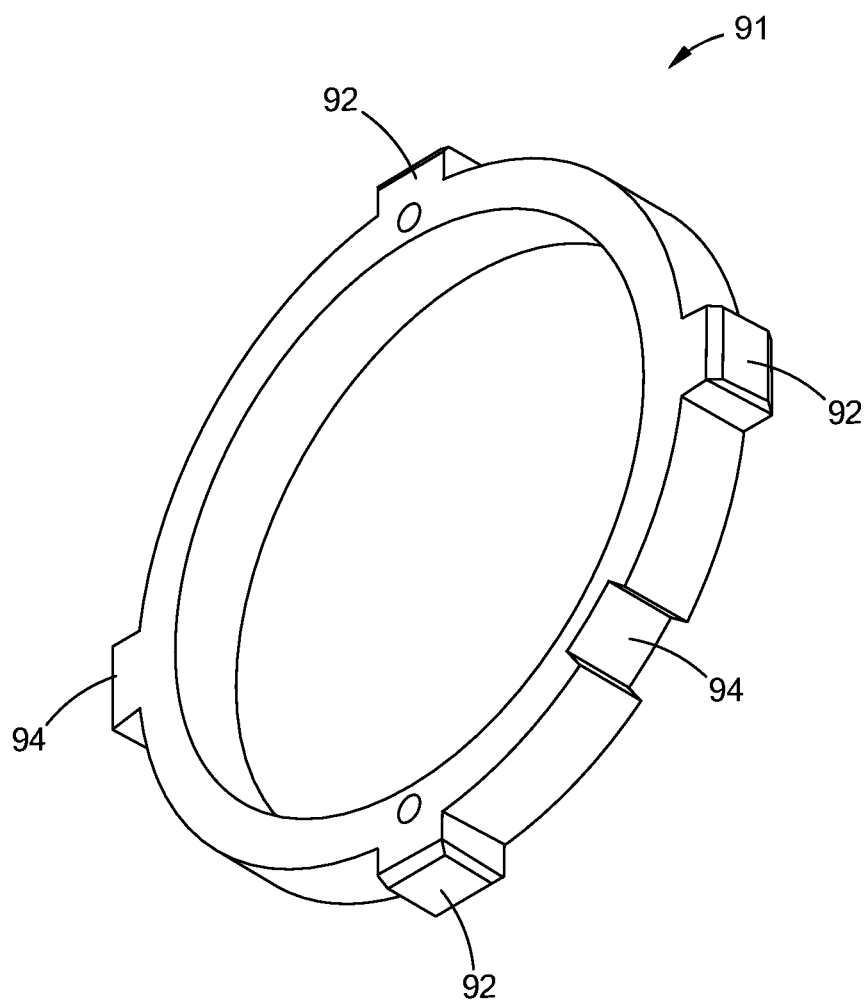
FIG. 7 is a perspective view of a form of a lock ring constructed in accordance with the principles of the present disclosure.

In some forms, the bypass valve assembly 10 includes a lock ring 91 disposed within the central bore 21 of the valve body 20 and at least partially around the valve stem 40 as seen in FIGS. 4 and 7. The lock ring 91 includes at least one radial key 92, and as illustrated in FIG. 7, a plurality of radial keys 92. Optionally, the lock ring 91 may include at least a partial recess (not illustrated) to receive a pin 37 (FIG. 4) that extends at least partially into a complementary hole in the valve stem 40. Alternatively or additionally, the lock ring 91 includes at least one radial slot 94. The radial key(s) 92 and/or the radial slot are adapted to engage complementary sized and shaped keys, such as key 15 (FIG. 4), and slots (not shown) within the valve body 20. Likewise, a spacer ring 96 may be disposed within the central bore 21 of the valve body 20 and at least partially around the valve stem 40.

The description of the disclosure is merely exemplary in nature and, thus, variations that do not depart from the substance of the disclosure are intended to be within the scope of the disclosure. Such variations are not to be regarded as a departure from the spirit and scope of the disclosure. It is therefore intended that such changes and modifications be covered by the appended claims.

What is claimed is:

1. A bypass valve assembly for use in a turbine generator, the bypass valve assembly comprising:

a valve body defining a central bore and a plurality of passageways, each passageway having a smaller area at an inlet portion and a larger area at an outlet portion to define a flared passageway;

a plurality of bypass seats, each bypass seat disposed within the inlet portion of a corresponding passageway of the plurality of passageways, the bypass seats being formed of a material having higher wear resistance than the valve body;

a valve stem disposed within the central bore of the valve body;

a valve cap secured to a distal portion of the valve body;

a bypass valve disc secured to a distal end portion of the valve stem;

a plurality of bypass valves, each bypass valve having a base portion and a nose portion, each nose portion defining a predefined contoured surface area and extending into a corresponding passageway of the plurality of passageways, and at least a portion of the contoured surface area having a wear coating disposed thereon; and a pressure seal head disposed around the valve stem, the pressure seal head defining steps having a wear coating disposed thereon.

2. The bypass valve assembly according to claim 1, wherein each bypass valve of the plurality of bypass valves includes an aperture extending laterally through a region of the bypass valve that is between the base portion and the nose portion, wherein the bypass valve assembly further comprises a plurality of pins, each pin of the plurality of pins extending into the bypass valve disc and being disposed within the aperture of a corresponding bypass valve to couple the corresponding bypass valve to the bypass valve disc while permitting a limited range of relative movement between the bypass valve and the bypass valve disc in a longitudinal direction of the bypass valve.

3. The bypass valve assembly according to claim 2, wherein each aperture is elongated in the longitudinal direction of the bypass valve.

4. The bypass valve assembly according to claim 1 further comprising a lock ring disposed within the central bore of the valve body, the lock ring including a plurality of radial keys and at least one radial slot adapted for engagement with the valve body.

5. The bypass valve assembly according to claim 1, wherein the bypass seats are a cobalt-chromium alloy material.

6. The bypass valve assembly according to claim 1, wherein the wear coating of the steps of the pressure seal head comprises a cobalt-chromium alloy material.

7. The bypass valve assembly according to claim 1, wherein the wear coating of the contoured surface area of each bypass valve comprises a PEMS (plasma enhanced magnetron sputtering) nanocoating.

8. The bypass valve assembly according to claim 7, wherein the nanocoating is a titanium silicon carbonitride (TiSiCN).

9. The bypass valve assembly according to claim 1, wherein the predefined contoured surface area defines an inwardly tapering geometry.

10. The bypass valve assembly according to claim 9, wherein the inwardly tapering geometry comprises a curved surface having a concave shape.

11. The bypass valve assembly according to claim 10, wherein the curved surface further defines a convex shape that forms a terminal end of the nose portion and transitions into the concave shape, the convex shape being downstream of the concave shape.

12. The bypass valve assembly according to claim 1, wherein the bypass valve further includes a radial flange disposed around a proximal end of the base portion, the radial flange adapted for engagement with the valve disc.

13. The bypass valve assembly according to claim 12, wherein the radial flange includes at least one of a notch and a recess in fluid communication with a fluid when in operation.

14. The bypass valve assembly according to claim 1, wherein the portion of the contoured surface area having the wear coating disposed thereon is at least partially downstream of a seating location of the bypass valve, the seating location being configured to engage the bypass seat of the corresponding passageway.

15. The bypass valve assembly according to claim 1, wherein the bypass valve stem is configured to move the valve body axially along a central axis to open or close a main valve assembly to control flow of a fluid through the main valve assembly.

16. The bypass valve assembly according to claim 15, wherein the bypass valve disc is movable along the central axis relative to the valve body, wherein each base portion is coupled to the bypass valve disc to be moved relative to the valve body in response to axial movement of the bypass valve disc relative to the valve body.

17. The bypass valve assembly according to claim 15, wherein the flared passageway expands in a downstream direction of the passageway, wherein each nose portion extends in the downstream direction from the base portion into the corresponding passageway.

18. A bypass valve assembly for use in a turbine generator, the bypass valve assembly comprising:

a valve body defining a central bore and a plurality of passageways;

a plurality of bypass seats, each bypass seat disposed within an inlet portion of a corresponding passageway of the plurality of passageways, the bypass seats being formed of a material having higher wear resistance than the valve body;

a valve stem disposed within the central bore of the valve body and movable relative to the valve body along a central axis of the central bore;

a valve cap secured to a distal portion of the valve body;

a bypass valve disc coupled to a distal end portion of the valve stem; and a plurality of bypass valves, each bypass valve having a base portion and a nose portion, each base portion being coupled to the bypass valve disc to be moved relative to the valve body by axial movement of the bypass valve disc relative to the valve body, each nose portion defining a predefined contoured surface area and extending into a corresponding passageway of the plurality of passageways, and at least a portion of the contoured surface area having a wear coating disposed thereon, the wear coating being downstream of a seating location of the bypass valve, the seating location being configured to engage the bypass seat of the corresponding passageway.

19. The bypass valve assembly according to claim 18, wherein the predefined contoured surface area includes a concave region and a convex region, the convex region defining a terminal end of the nose portion and transitions into the concave region.

20. A bypass valve assembly for use in a turbine generator, the bypass valve assembly comprising:

a valve body defining a central bore and a plurality of passageways;

a plurality of bypass seats, each bypass seat disposed within an inlet portion of a corresponding passageway of the plurality of passageways, the bypass seats being formed of a material having higher wear resistance than the valve body;

a valve stem disposed within the central bore of the valve body;

a valve cap secured to a distal portion of the valve body;

a bypass valve disc secured to a distal end portion of the valve stem;

a plurality of pins extending into the bypass valve disc; and a plurality of bypass valves, each bypass valve having a base portion, an intermediate portion, and a nose portion, the nose portion defining a predefined contoured surface area and extending into a corresponding passageway of the plurality of passageways, and at least a portion of the contoured surface area having a wear coating disposed thereon, the intermediate portion defining an aperture extending laterally through the bypass valve, the aperture being elongated in a longitudinal direction of the bypass valve, wherein each pin of the plurality of pins extends into the elongated aperture of a corresponding bypass valve of the plurality of bypass valves to couple the bypass valve to the bypass valve disc while permitting a limited range of relative movement between the bypass valve and the bypass valve disc in the longitudinal direction of the bypass valve.

* * * * *